Jan. 27, 1931.  W. E. MACKEY  1,790,432
ANIMAL TRAP
Filed April 3, 1930  2 Sheets-Sheet 1

Inventor
W. E. Mackey
By Watson E. Coleman
Attorney

Jan. 27, 1931.  W. E. MACKEY  1,790,432
ANIMAL TRAP
Filed April 3, 1930  2 Sheets-Sheet 2
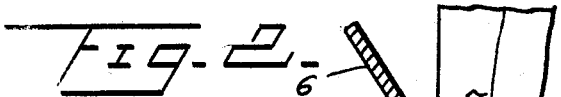
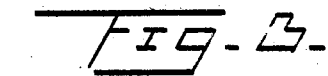
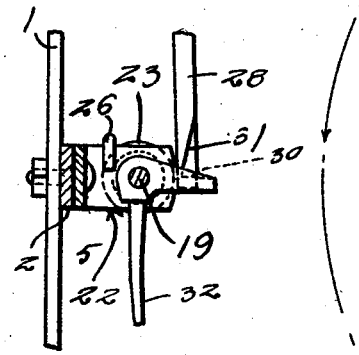
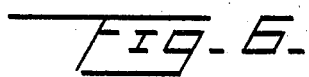
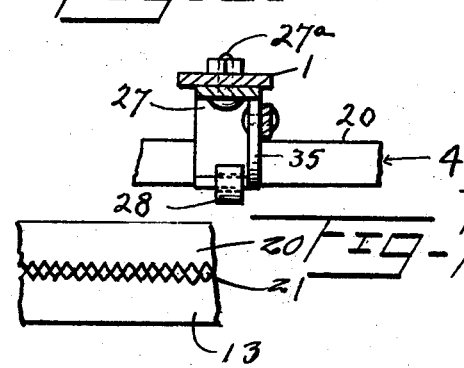
Inventor
W. E. Mackey
By Watson E. Coleman
Attorney Patented Jan. 27, 1931

1,790,432

UNITED STATES PATENT OFFICE

WILLIAM E. MACKEY, OF MORGANTOWN, WEST VIRGINIA

ANIMAL TRAP

Application filed April 3, 1930. Serial No. 441,311.

This invention relates to traps of the jaw type, and has for one of its objects to provide a novel device of this character which shall be adapted to be hung from a tree, stake or the like with the bait attached directly to its trigger so as to enable it to be effectively used for catching all small fur bearing animals.

The invention has for a further object to provide a trap of the character stated which shall be adapted to be hung from its support for free swinging movement with respect thereto to the end that any effort made by an entrapped animal to escape will be rendered futile.

The invention has for a further object to provide a trap of the character stated which shall embody relatively fixed and movable jaws, a spring associated with the movable jaw, a lever and trigger adapted to hold the movable jaw in opened position against the tension of the spring, and a safety hook adapted to hold the movable jaw in opened position while the trigger is being engaged with the lever.

The invention has for a further object to provide a trap of the character stated wherein the lever and trigger shall be of such construction as to permit the former to be released as the result of an inward or outward movement of the latter with respect to the trap support and thus insure the releasing of the movable jaw as the result of any effort to take the bait.

With the foregoing and other objects in view, the nature of which will appear as the description proceeds, the invention consists in the construction, combination and arrangement of parts hereinafter fully described and claimed, and illustrated in the accompanying drawings, wherein:—

Figure 2 is a sectional view taken on the vertical planes indicated by the line 2—2 of Figure 1;

Figure 3 is a sectional view taken on the vertical plane indicated by the line 3—3 of Figure 1;

Figure 4 is a sectional view taken on the vertical plane indicated by the line 4—4 of Figure 1;

Figure 6 is a sectional view taken on the horizontal plane indicated by the line 6—6 of Figure 1, and Figure 7 is a view in elevation of a slightly modified form of the active members of the jaws of the trap.

Figure 1:
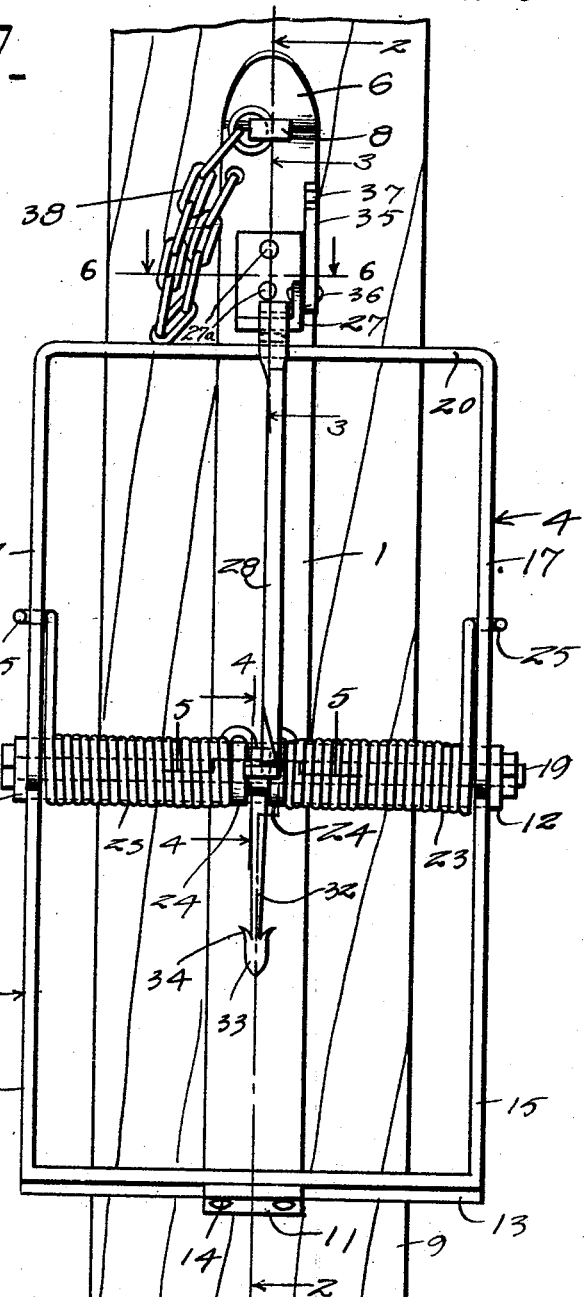
Figure 1 is a view in front elevation of the trap hung from a tree, stake or other support.
Figure 5:
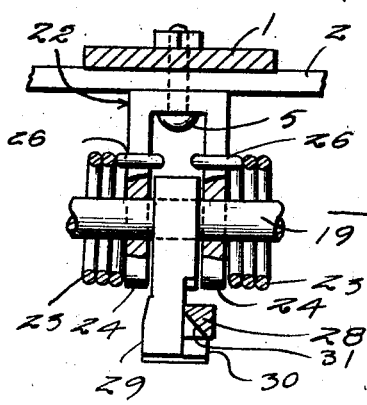
Figure 5 is a sectional view taken on the horizontal planes indicated by the line 5—5 of Figure 1.

The trap comprises a vertical frame bar 1, a horizontal frame bar 2, a fixed jaw 3 and a pivoted jaw 4. The bar 2 is secured to the bar 1 by a bolt 5, and the connection between these parts is established at a point centrally between the ends of the former and at a point below the center of the latter. The upper end of the bar 1 curves upwardly and outwardly, as shown at 6, and this bar is provided immediately below this portion thereof with an opening 7 for the reception of a pin 8 for hanging the trap to a support 9 such as a tree, stake or the like. The bar 1 is provided at its lower end with an outwardly directed arm 10 having an outwardly and upwardly directed outer end portion 11. The bar 2 is provided at its ends with outwardly directed arms 12.

The fixed jaw 3 is of U-form in elevation and has the center of its cross bar 13 secured, as at 14, to the angular terminal portion 11 of the arm 10. The side bars 15 of the jaws 3 are secured, as at 16, to the inner end portions of the arms 12. The jaw 3 occupies a downwardly and outwardly inclined position. The pivoted jaw 4 is also of U-form in elevation and has its side bars 17 pivotally secured by a shaft 19 to the outer ends of the arms 12. When in closed position, the jaw 4 rests upon the jaw 3, and when in opened position, the jaw 4 extends upwardly from the jaw 3. The cross bar 13 of the jaw 3 and the cross bar 20 of the jaw 4 may have their active edges smooth as shown in Figures 1 and 2 or serrated, as shown at 21 in Figure 7.

The shaft 19 extends from one of the arms 12 to the other and is supported at its center by a bearing bracket 22 of U-form in plan and secured to the bars 1 and 2 by the bolt 5. Coil springs 23 are mounted upon the shaft 19 between the arms 12 and the arms 24 of the bearing bracket 22. The outer ends of the springs 23 are secured, as at 25, to the side bars 17 of the jaw 4, and the inner ends thereof are secured, as at 26, to the bearing bracket arms 24. The springs 23 function to move the jaw 4 from its opened to its closed position, and function to hold this jaw in closed position under pressure.

A bracket 27 is secured, as at 27ª, to the bar 1, and occupies a position above the bar 20 of the jaw 4 when this jaw is in opened position. A lever 28 which is pivotally connected to the bracket 27 extends downwardly across the bar 20 of the jaw 4, and a trigger 29 pivotally secured at one end to the shaft 19 between the bearing bracket arms 24 and engaging the free ends of the lever, serve to releasably support this jaw in opened position. The trigger 29 contacts with one lateral side of the lever 28 and is provided at its free end with a laterally directed lug 30 which contacts with the front side of the free end of the lever slightly below a notch 31 formed in said lateral side of the lever. An operating arm 32 extends downwardly from the pivoted end of the trigger 29, and has its lower end sharpened, as shown at 33, and provided with barbs 34 to permit the bait to be readily placed thereon and firmly secured thereto. The connection between the trigger 29 and the free end of the lever 28 is such that the inward movement of the bait carrying arm 32 will carry the lug 30 below the free end of the lever and that the outward movement of the bait carrying arm will carry the lug 30 into the notch 31, with the result that the lever 28, and consequently the pivoted jaw 4, will be released as the result of the movement of the bait carrying arm in either of these directions.

The pivoted jaw 4 is adapted to be held in opened position, during the engagement of the trigger 29 with the lever 28, by a safety catch 35 which is pivoted at one end, as at 36, to the bracket 27, and is provided at its free end with a hook 37 for engagement with the bar 20 of this jaw. In order to prevent the loss thereof, the pin 8 is secured to the bar 1 by a chain 38.

In practice, the trap is adapted to be hung from a tree, stake or the like through the medium of the pin 8. The opening 7 is considerably larger than the pin 8, and due thereto and to the outwardly directed upper end portions 6 of the bar 1, the trap will swing outwardly and laterally with respect to its support as the result of an animal's attempt to escape therefrom, and such movements of the trap will render such attempts futile. The pin 8 is headed, as shown at 39, to prevent the trap from being disengaged therefrom. When the trap is set, the fixed jaw 3 extends downwardly and outwardly with respect to the pivoted jaw 4 and the bait 40 on the arm 32 is arranged centrally of the jaw 3, so that any attempt on the part of an animal to remove the bait will result in its positioning its neck across the bar 13 of the jaw 3 in the path of the movement of the bar 20 of the jaw 4. As any inward or outward movement of the trigger 29 will result in the releasing of the lever 28, any attempt on the part of an animal to remove the bait 40 will result in the springing of the trap. When using the trap for muskrat, rabbits, skunks and other animals of similar size, the trap is hung from its support with the bar 13 about three inches from the ground, and when using the trap for foxes, coons and other animals of similar size, the trap is hung from its support with said bar about ten inches from the ground.

While I have described the principle of the invention, together with the structure which I now consider the preferred embodiment thereof, it is to be understood that the structure shown is merely illustrative and that such changes may be made, when desired, as fall within the scope of the invention as claimed.

I claim:—

1. A trap comprising a frame adapted to be hung from a tree or other support, a fixed jaw carried by the frame and occupying a downwardly and outwardly inclined position with respect thereto, a pivoted jaw carried by the frame and adapted to extend upwardly from the fixed jaw when in opened position, a bracket carried by the frame and arranged above the pivoted jaw when the latter is in opened position, a safety hook pivotally secured to the bracket for movement into and out of engagement with the pivoted jaw, means for releasably securing the pivoted jaw in opened position and embodying a lever pivoted at one end to the bracket and a trigger for engagement with the the free end of the lever, means pivotally connecting the trigger to the frame, a bait carrying and trigger operating arm secured to the trigger and arranged centrally of the fixed jaw, and means for moving the pivoted jaw when released into closed position.

2. A trap comprising a frame adapted to be hung from a tree or other support, a fixed jaw carried by the frame and occupying a downwardly and outwardly inclined position with respect thereto, a pivoted jaw carried by the frame and adapted to extend upwardly from the fixed jaw when in opened position, means for releasably securing the pivoted jaw in opened position and embodying a lever and a trigger, means pivotally connecting one end of the lever to the frame at a point above the opened position of the pivoted jaw, the lever being provided near its free end with a lateral notch, means pivotally securing the trigger to the frame, a lug carried by the trigger and contacting with the outer side of the free end of the lever below said notch, a bait carrying and trigger operating arm secured to the trigger and arranged within the fixed jaw, and means for moving the pivoted jaw when released into closed position.

3. A trap comprising right angularly related frame bars, one of said frame bars being provided at one end with an arm and the other of said frame bars being provided at its ends with arms, a fixed jaw of U-form having its crossed bar secured to the free end of said first arm and its side bars secured to the fixed ends of said sceond arms, a bearing bracket of U-form secured to the frame bars, a shaft carried by said second arms and bearing bracket, a pivoted jaw of U-form having its side bars connected to the shaft, coil springs mounted upon the shaft between said second arms and bearing bracket and having certain of their ends connected to the pivoted jaw and their other ends connected to the bearing bracket, a trigger pivotally mounted at one end upon the shaft within the bearing bracket and provided at its pivoted end with a laterally directed lug, a bait carrying and operating arm secured to the trigger, and a lever pivotally connected at one end to one of said frame bars and having its other end engaged by the lug of the trigger.

In testimony whereof I hereunto affix my signature.

WILLIAM E. MACKEY.